United States Patent
Burkhardt et al.

(10) Patent No.: US 10,871,962 B2
(45) Date of Patent: Dec. 22, 2020

(54) ZERO DOWNTIME MAINTENANCE IN CONSTRAINED SYSTEMS

(71) Applicant: SAP SE, Walldorf (DE)

(72) Inventors: Erwin Burkhardt, Burgstetten (DE); Steffen Meissner, Heidelberg (DE); Martin Mayer, Heidelberg (DE); Christoph Luettge, Muehltal (DE); Juergen Specht, Gerabronn (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 577 days.

(21) Appl. No.: 15/167,746

(22) Filed: May 27, 2016

(65) Prior Publication Data
US 2017/0344362 A1    Nov. 30, 2017

(51) Int. Cl.
*G06F 8/656* (2018.01)
*G06F 9/451* (2018.01)
*H04L 29/08* (2006.01)

(52) U.S. Cl.
CPC .............. *G06F 8/656* (2018.02); *G06F 9/451* (2018.02); *H04L 67/34* (2013.01)

(58) Field of Classification Search
None
See application file for complete search history.

(56) References Cited

U.S. PATENT DOCUMENTS

| | | | |
|---|---|---|---|
| 6,810,429 B1 * | 10/2004 | Walsh | G06F 17/30569 707/E17.006 |
| 7,523,142 B2 | 4/2009 | Driesen et al. | |
| 7,657,575 B2 | 2/2010 | Eberlein et al. | |
| 7,720,992 B2 | 5/2010 | Brendle et al. | |
| 7,734,648 B2 | 6/2010 | Eberlein | |
| 7,739,387 B2 | 6/2010 | Eberlein et al. | |
| 7,962,920 B2 | 6/2011 | Gabriel et al. | |

(Continued)

OTHER PUBLICATIONS

Microsoft, "Install Windows 7 Service Pack 1 (SP1)." Microsoft Support, Aug. 31, 2016, <support.microsoft.com/en-us/help/15090/windows-7-install-service-pack-1-sp1>. Accessed Feb. 27, 2018.*

(Continued)

*Primary Examiner* — Wei Y Zhen
*Assistant Examiner* — Binh Luu
(74) *Attorney, Agent, or Firm* — Fish & Richardson P.C.

(57) ABSTRACT

Methods, systems, and computer-readable storage media for deploying upgrade packages during zero downtime upgrade of production systems include actions of receiving an upgrade package, the upgrade package defining one or more changes to be deployed to a system that has already undergone partial deployment during a zero downtime upgrade, and including one or more objects having respective object types, receiving a deployment configuration, the deployment configuration providing a plurality of lists of object types for respective constraints and, for each list of object types, specifying a deployment option for object types in the respective list of object types, determining a set of object types included in the upgrade package, the set of object types comprising one or more object types, and selectively permitting deployment of the upgrade package to execute the one or more changes based on the set of object types and the plurality of lists of object types.

20 Claims, 5 Drawing Sheets

(56) References Cited

U.S. PATENT DOCUMENTS

| | | |
|---|---|---|
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,356,010 B2 | 1/2013 | Driesen |
| 8,375,130 B2 | 2/2013 | Eberlein et al. |
| 8,380,667 B2 | 2/2013 | Driesen |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,392,573 B2 | 5/2013 | Lehr et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 2009/0210866 A1* | 8/2009 | Troan .................. G06F 8/65 717/168 |
| 2009/0288079 A1* | 11/2009 | Zuber .................. G06F 21/51 717/176 |
| 2009/0300597 A1* | 12/2009 | George ............ G06F 9/44526 717/173 |
| 2010/0153341 A1 | 6/2010 | Driesen et al. |
| 2011/0252415 A1* | 10/2011 | Ricci .................. G06Q 10/06 717/173 |
| 2012/0233605 A1* | 9/2012 | Lupu .................. G06F 11/0709 717/172 |
| 2014/0258999 A1 | 9/2014 | Kathar et al. |
| 2014/0325498 A1* | 10/2014 | Sirois .................. G06F 8/65 717/170 |
| 2014/0359594 A1 | 12/2014 | Erbe et al. |
| 2015/0106140 A1* | 4/2015 | Biewald ............ G06Q 10/0631 705/7.12 |
| 2015/0193224 A1* | 7/2015 | Ziat .................. G06F 8/65 717/172 |
| 2016/0085542 A1* | 3/2016 | Meissner .......... G06F 17/30575 707/634 |
| 2016/0098267 A1* | 4/2016 | Meissner .......... G06F 17/30292 717/168 |
| 2016/0098438 A1* | 4/2016 | Eberlein .......... G06F 17/30362 707/704 |
| 2016/0098443 A1* | 4/2016 | Specht .................. G06F 8/65 707/634 |
| 2016/0162275 A1* | 6/2016 | Morley .................. G06F 8/65 717/170 |
| 2017/0116296 A1* | 4/2017 | Specht .......... G06F 17/30569 |
| 2017/0123787 A1* | 5/2017 | Burkhardt .................. G06F 8/66 |
| 2017/0161291 A1* | 6/2017 | Specht .......... G06F 17/30117 |
| 2017/0185392 A1* | 6/2017 | Konrad .................. G06F 8/65 |
| 2017/0344362 A1* | 11/2017 | Burkhardt .................. G06F 8/656 |
| 2018/0232382 A1* | 8/2018 | Mayer .......... G06F 17/30221 |

OTHER PUBLICATIONS

EPO Communication and European Supplemental Search Report from related foreign matter; Application No. 17000869.2-1954; dated Oct. 6, 2017; 7 pages.

* cited by examiner

ZERO DOWNTIME MAINTENANCE IN CONSTRAINED SYSTEMS

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases.

During a lifecycle of the application and/or database, one or more maintenance operations may be required. Example maintenance operations include upgrading, configuring, patching, and testing. In order to perform such maintenance procedures, the application and/or database may be taken offline, such that users are unable to interact with the application and/or database, which is referred to as downtime. Although software providers have strived to minimize downtime, achieving zero downtime during such maintenance procedures has been an elusive goal. Further, some maintenance procedures have required, for example, copying of data to separate databases, which can require additional resources (e.g., computer processing, memory).

SUMMARY

Implementations of the present disclosure include computer-implemented methods for zero downtime upgrades in constrained systems. In some implementations, actions include receiving an upgrade package, the upgrade package defining one or more changes to be deployed to a system that has already undergone partial deployment during a zero downtime upgrade, and including one or more objects having respective object types, receiving a deployment configuration, the deployment configuration providing a plurality of lists of object types for respective constraints and, for each list of object types, specifying a deployment option for object types in the respective list of object types, determining a set of object types included in the upgrade package, the set of object types comprising one or more object types, and selectively permitting deployment of the upgrade package to execute the one or more changes based on the set of object types and the plurality of lists of object types. Other implementations of this aspect include corresponding systems, apparatus, and computer programs, configured to perform the actions of the methods, encoded on computer storage devices.

These and other implementations can each optionally include one or more of the following features: selectively permitting deployment of the upgrade package includes determining that the upgrade package includes one or more grey-listed object types, and deploying the one or more grey-listed object types using an extension to a standard deployment procedure; the extension is provided in the deployment configuration; selectively permitting deployment of the upgrade package includes determining that the upgrade package includes one or more white-listed object types, and deploying the one or more white-listed object types using a standard deployment procedure; selectively permitting deployment of the upgrade package includes determining that the upgrade package includes at least one black-listed object type, and in response, rejecting the upgrade package for deployment; the upgrade package is received in response to a test indicating one or more corrections are to be deployed to the system; and the zero downtime upgrade procedure is conducted to upgrade a production system, while the production system remains in production use.

Implementations of the present disclosure provide one or more of the following example advantages. In some examples, change procedures running on application servers typically require exclusive access to the system, and it is not possible to run two different procedures in parallel (e.g. an upgrade and a patch, a client copy and a patch, etc.). Implementations of the present disclosure enable different procedures to be executed in parallel (e.g., executing a short procedure during execution of a longer procedure). For a zero downtime upgrade procedure, the runtime can be in the order of a week or more. During this period, users want to deploy additional changes to the system, not only the changes defined at the beginning of the week (e.g., as the custom developer and administrator configure the system provide additional changes). Implementations of the present disclosure enable such additional changes to be deployed in parallel to an on-going zero downtime maintenance. Further, zero downtime upgrade enables testing the target version, before end users consumption is switched to the target system (e.g., the target system is switched to production). During these tests, errors can be found, and it is desirable to deploy a correction to the target release before switching users over. In some examples, it is desirable to deploy a small correction only, as opposed to re-running the complete procedure again with the new content (e.g., starting over to include the corrections from the beginning). Implementations of the present disclosure enable corrections to be deployed without having to restart the entire procedure. Furthermore, implementations of the present disclosure minimize downtime and minimize effort, as well as reducing overall runtime of the entire upgrade procedure.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to zero downtime upgrades, which upgrades can constrain subsequent changes to a system (e.g. no additional changes can be deployed or only a certain subset of changes can be deployed). More particularly, implementations of the present disclosure are directed to deploying one or more additional upgrade packages during a zero downtime upgrade of a production system to a target system. In some examples, a deployment can be completed during zero downtime maintenance, but it can be determined that corrections are required before the target system can be transitioned into production (e.g., replacing the current production system). For example, the target system can be tested during the zero downtime maintenance, which testing can indicate corrections that are required.

In some implementations, and as described in further detail herein, a standard deployment procedure is extended based on one or more alternative deployment procedures in a way to specify the constraints at each step of the standard deployment procedure. In some examples, implementations of the present disclosure enable an additional upgrade package to be deployed during an already running zero downtime maintenance (e.g., to address corrections). In some examples, the system undergoing the zero downtime maintenance can be determined to be a constrained system. In some examples, a constrained system is a system that is undergoing zero downtime maintenance, during which a state of the system has been altered (e.g., a table in a database is replaced by a construction of two tables and a database trigger that replicates data from one table to another table).

Figure 1:
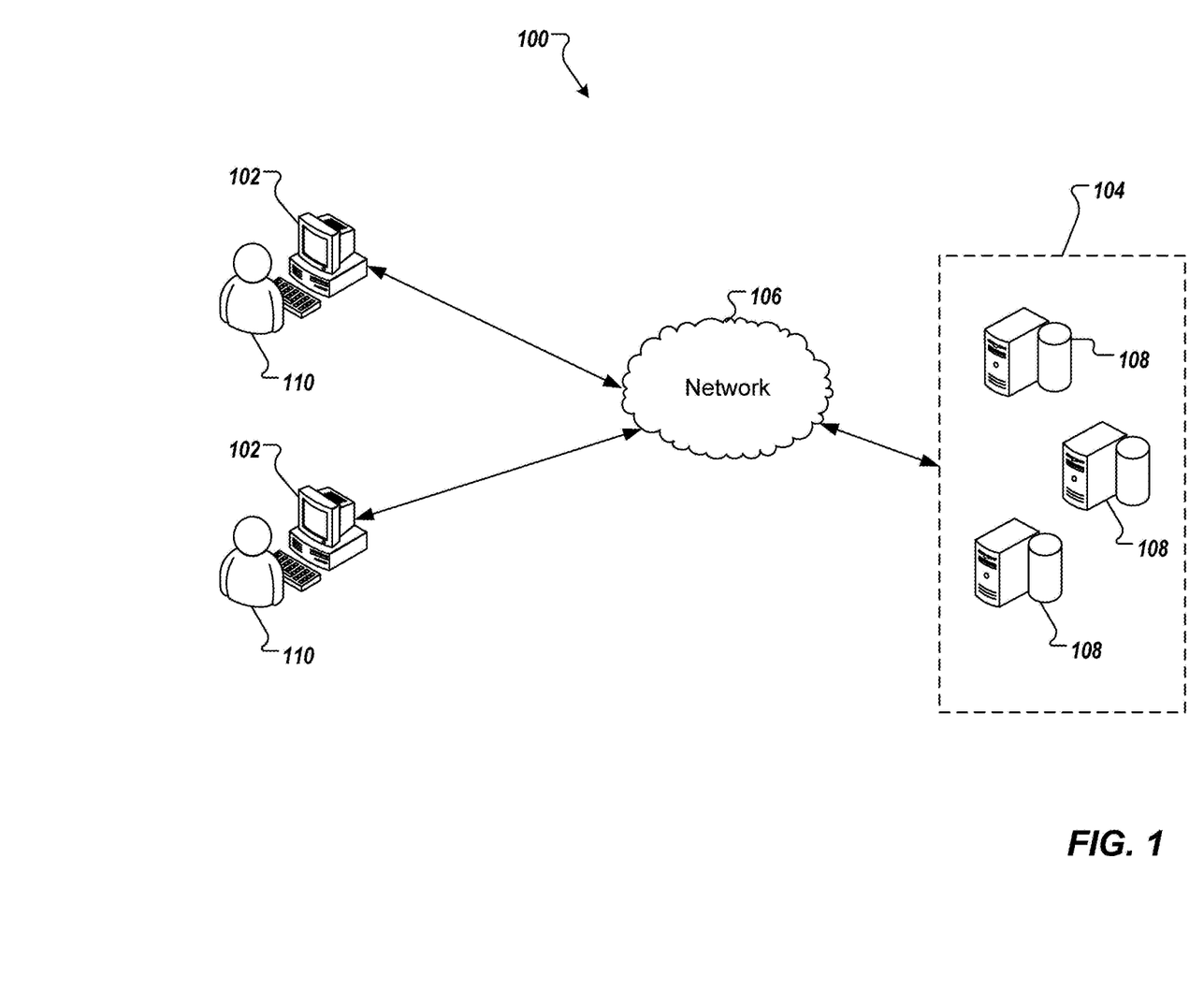
FIG. 1 depicts an example high-level architecture in accordance with implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 108 can include a user, who interacts with an application that is hosted by the server system 104. In another example context, a user 108 can include a user, who interacts with the server system 104 to perform one or more maintenance procedures, described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An in-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications. Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more applications can be hosted by the server system 104. A user 110 can interact with a application using the client device 102. More specifically, a session can be established between the client device 102 and one or more server devices 104, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

In some implementations, applications and/or databases undergo lifecycle management. In some examples, lifecycle management includes executing one or more maintenance procedures for an application and/or a database. Example maintenance procedures can include an upgrade procedure, a patch procedure, a configuration procedure, and development and testing procedures. Implementations of the present disclosure will be described in further detail herein with reference to an upgrade procedure. An example upgrade procedure can include updating software. For example, an application can be updated from a first version (e.g., V1) to a second version (e.g., V2). Example updates can include adding functionality to the application, and/or structural changes to one or more tables stored in one or more databases. As another example, a database can be updated from a first version (e.g., V1) to a second version (e.g., V2). Example updates can include updating a data schema of the database, which can involve structural changes to one or more tables. In some examples, a data schema (also referred to as database schema) is a data structure that defines how data is to be stored in the database. In some examples, the databases schema can be defined in a formal language that is supported by a database management system (DBMS). In general, a data schema can be described as a catalog that specifies all database objects that can be stored in the database. In some examples, different data schemas (e.g., V1 versus V2) can have different objects with the same object name, but different structures.

As introduced above, the execution of maintenance procedures traditionally results in downtime (e.g., unavailability) of an application and/or database. More particularly, and to provide further context for implementations of the present disclosure, for application servers and/or databases, computer-implemented deploy tools conduct operations to deploy, configure, and/or update an application and/or database as part of one or more maintenance procedures. In some examples, the deploy tools can rely on a certain system state, and execute a sequence of actions, which alter the system. Consequently, during the deployment of a maintenance package (e.g., an upgrade package) to an application server, for example, the system is not in a standard configuration. This can mean, for example, that a table in a database is replaced by a construction of two tables and a database trigger that replicates data from one table to another table. Such a setup, however, does not support deployment of another structural change to the table already being altered, for example. Typically (not using zero downtime), it is not possible to run two deployments (e.g., runtime (V1), target (V2)) at the same time, and they are instead run in a sequence. For example, the second deployment can only be brought online as the first deployment is brought offline.

With traditional maintenance (e.g., updates to an application server), the duration of the deployment can be quite considerable, and can spread over several days, if not weeks. If, during this period, errors are found, corrections that are created must be deployed as well.

In contrast, zero downtime maintenance enables the current (production) software (e.g., V1) to continue running during the deployment of the target release software (e.g., V2). To accomplish this, the system is considerably altered, such that the system state is no longer "standard." Consequently, the deploy tools cannot deploy to the target system in a zero downtime upgrade setup. In fact, the deploy tools set a semaphore (e.g., lock) to ensure that no parallel deployment can be started.

In some examples, zero downtime maintenance is designed, such that all required packages need to be deployed before the current system (e.g., V1) is switched to the target system (e.g., V2). If the target system is not complete (e.g., one package is missing), switching over to the target system would run into problems. Consequently, deployment of additional packages during the maintenance procedure is required. In some examples, zero downtime can allow testing of the target system before the production is switched to the target system, such that any problems can be identified and corrected. To enable this correction process, however, the deployment of deltas (e.g., differences between the current system and the target system) into a system in the zero downtime upgrade configuration needs to be enabled.

Figure 2:
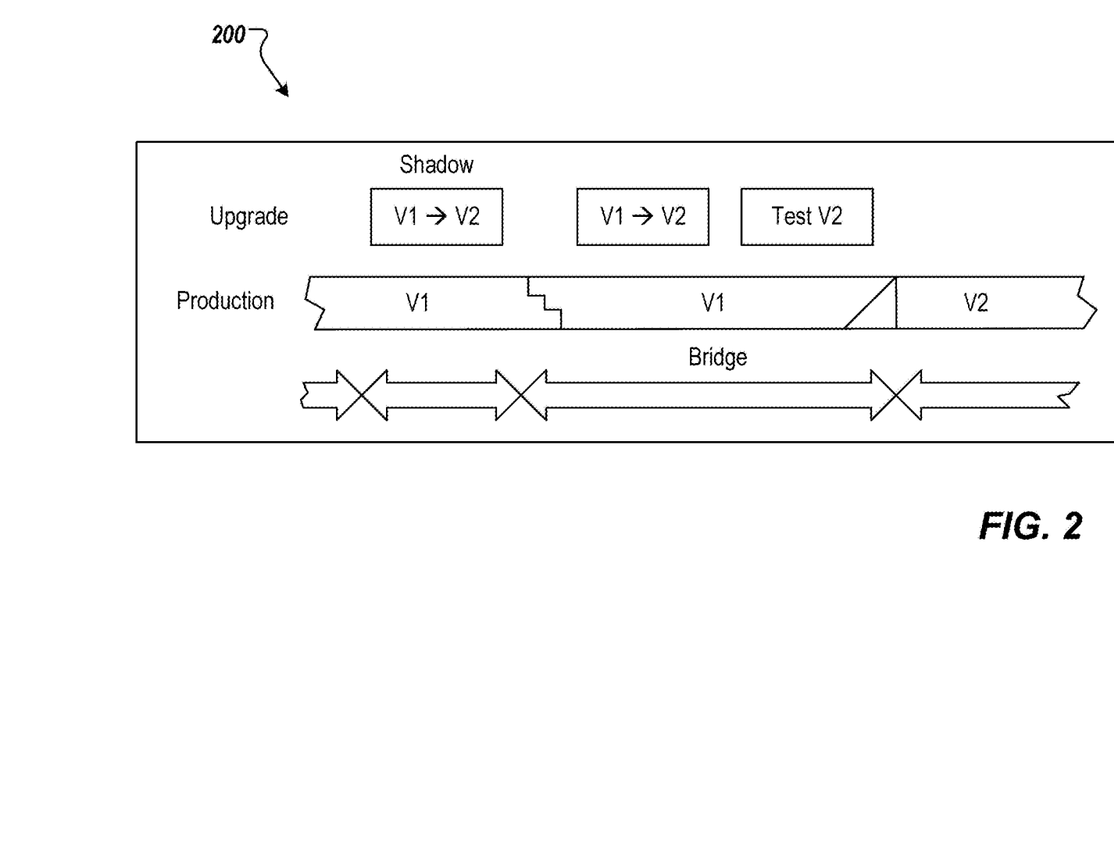
FIG. 2 schematically depicts an example zero downtime upgrade procedure.

FIG. 2 schematically depicts an example upgrade procedure 200 using zero downtime maintenance. More particularly, FIG. 2 provides an overview of an example upgrade procedure moving from a first version (V1) of an application on a production system to a second version (V2) of the application on a target system. In accordance with the example upgrade procedure, the production system executes V1. The target system, which can include shadow tables, is prepared. In some examples, no changes are initially made to table structures, except where upgrades require changes. Next, target database structures and content are prepared, during which, tables being migrated are only accessible using read-only (RO) access. In some examples, and prior to deployment of V2, the target software can be tested. If the testing is successful, the production system is switched from V1 to V2, and activities are drained/ceased on the previous production system.

In some examples, a zero downtime upgrade procedure can be realized by generating upgrade scripts, and, subsequently, revoke scripts. The application upgrade package can be analyzed to determine, for example, which tables receive content from the upgrade package, and are changed in structure by the upgrade package. In some examples, the target software is prepared in parallel to production use. The target database tables are also prepared, and in the case where a table receives content from the upgrade package, the table is cloned (e.g., a copy of the table is created including all content and one or more triggers ensure the content remains up-to-date to changes). In cases where a table's content is migrated, a copy of the table is created, the original table can be designated as RO, and a migration report can be provided. Thereafter, the upgraded content is deployed to the cloned tables. After the target system (V2) is tested and confirmed to be working properly, users can be switched to the target version (e.g., the target system is switched into production).

Further details of example data access management during zero downtime upgrade, and an overview of zero downtime upgrade procedures are provided in commonly assigned, co-pending U.S. application Ser. No. 14/504,241, filed on Oct. 1, 2014, the disclosure of which is expressly incorporated herein by reference in the entirety for all purposes.

In view of the context provided above, implementations of the present disclosure enable zero downtime upgrades in constrained systems. In some examples, a constrained system is a system that is undergoing zero downtime maintenance, during which a state of the system has been altered (e.g., a table in a database is replaced by a construction of two tables and a database trigger that replicates data from one table to another table). More particularly, and as described in further detail herein, a standard deployment procedure is extended based on one or more alternative deployment procedures in a way to specify the constraints at each step of the standard deployment procedure. For example, at the beginning of the deployment procedure, the procedure could specify "no constraint," and a new upgrade package could simply be added to a list of upgrade packages being deployed, each upgrade package including one or more objects. In a later stage of deployment, for example, it can be possible to deploy new reports and classes, while it is not possible to deploy table structure changes.

In further detail, implementations of the present disclosure provide a zero downtime upgrade procedure, in which one or more upgrade packages are to be deployed to transition from a production system to a target system (e.g., upgrade from V1 to V2). In some implementations, a deployment procedure is configured and provides a set of constraints (e.g., $C \to \{c_1, \ldots, c_n\}$), and, for each constraint, a set of lists of object types (e.g., $L \to \{l_1, \ldots, l_m\}$) is provided. In some examples, each list of object types ($l_i \to \{o_1, \ldots, o_p\}$; where $i=1, \ldots, m$) includes one or more object types, and defines how the one or more object types are to be handled during deployment. In some implementations, an alternative deployment procedure is defined for object types in at least one list of object types. In some examples, the alternative deployment procedure for object types in at least one list of object types is effective to deploy the object types given the constraint (configuration).

In some examples, the set of lists of object types includes three lists (e.g., $m=3$) provided as:
- $l_1 \to$ "white list": a list of object types supported for deployment, no special procedure required;
- $l_2 \to$ "grey list": a list of object types supported for deployment, but a special sequence of deployment steps is required; and
- $l_3 \to$ "black list": a list of object types not supported for deployment.

In the context of an upgrade to an application, example constraints can include "shadow repository created," and "bridge setup—triggers replicating," and example object types can include "reports," and "classes," which specify that the deploy tool writes the object types to the shadow repository. Example object types can also include "table content," "table structure changes," and "application functions reading table content," for which the deployment can be scheduled for the normal deployment (which had not taken place at "shadow repository" step). In the context of an upgrade to an application, an example extension can include "collision pattern extension procedure." In some examples, the table content deployed to the system is also added to a collision handling of the DB triggers, which replicate data from the production tables to the target tables, the triggers are configured not to overwrite the deployed content. The deploy procedure is extended in this constraint by writing collision patterns. In the constraint "bridge setup—triggers replicating," an object type can be "table structure change." In this case, the table is cloned and trigger replication is set up. The clone table is created with the target structure (the normal deploy procedure for structure change would be to alter the table directly).

In some implementations, the same object can be in a different list depending upon the particular constraint. For example, for a constraint $c_1$, an object type $o_3$ is in $l_1$ (i.e., under constraint $c_1$, no special procedure is required for objects of object type $o_3$), for a constraint $c_2$, the object type $o_3$ is in $l_2$ (i.e., under constraint $c_2$, a special deployment procedure is required for objects of object type $o_3$), and for a constraint $c_3$, the object type $o_3$ is in $l_3$ (i.e., under constraint $c_3$, objects of object type $o_3$ cannot be deployed).

In some implementations, a matrix can be provided for each constraint, indicating which list each object type is assigned to for the particular constraint. Example matrices for respective constraints $c_1$ and $c_2$ can be provided as:

| $c_1$ | $o_1$ | $o_2$ | $o_3$ | $o_4$ | $o_5$ | $o_6$ |
|---|---|---|---|---|---|---|
| $l_1$ (white) | x | x | x | | | |
| $l_2$ (grey) | | | | x | | x |
| $l_3$ (black) | | | | | x | |

| $c_2$ | $o_1$ | $o_2$ | $o_3$ | $o_4$ | $o_5$ | $o_6$ |
|---|---|---|---|---|---|---|
| $l_1$ (white) | x | | | x | | |
| $l_2$ (grey) | | x | x | | | |
| $l_3$ (black) | | | | | x | x |

In accordance with implementations of the present disclosure, the deploy tool is extended to include a procedure for deployment to constrained systems. In some implementations, the extended deploy tool processes an upgrade package for deploying the target system. In some examples, the deploy package includes a set of objects to be deployed, each object having a respective object type. In some implementations, the deploy tool determines whether there is a constraint on the deployment. If there is no constraint, the deployment of the upgrade package is performed without special deployment steps.

If there is a constraint, the particular constraint is identified, and the corresponding lists of object types in the upgrade package are determined. If black-listed object types of the constraint are included in the upgrade package, the upgrade package is rejected (e.g., only complete package deployment is supported). If no black-listed object types of the constraint are included in the upgrade package, the deployment is started, and the special deployment steps are performed for grey-listed object types, if any.

To assist in illustrating implementations of the present disclosure, a relatively simple example zero downtime upgrade will be described. In the example, the constraint "bridge setup—triggers replicating" is provided and is associated with white-listed object types including reports, and classes, grey-listed object types include table content for managed tables, and black-listed object types include table structure changes. An example upgrade package includes report "RSVBCHK," and table content for customizing a table C001 (a managed table in the sense of the zero downtime procedure).

During the deployment, and in accordance with implementations of the present disclosure, the upgrade package is checked against the lists of object types for the constraint "bridge setup—triggers replicating." In this example, report is white-listed and table content is grey-listed. Consequently, the deployment of the upgrade package is determined to be acceptable with respect to report and table content, but an extension "collision pattern extension procedure" is to be used to deploy the table content. The computer-implemented deploy tool deploys the report "RSVBCHK" using standard deployment procedures (e.g., one or more scripts are executed to deploy the reports), and calls the "collision pattern extension procedure" is executed by the deploy tool (e.g., one or more scripts are executed to deploy the tables based on the extension). For example, table keys of the tables that are to be deployed are determined, and the table keys are entered into a collision pattern table of a trigger that is used to replicate data from a current table (e.g., V1 table called "C001") to a target table (e.g., V2 table called "C001"). The deploy tool deploys the content to table C001 using standard deploy procedures (e.g., one or more scripts provide in the non-extended deploy tool are executed to deploy the content).

Figure 3:
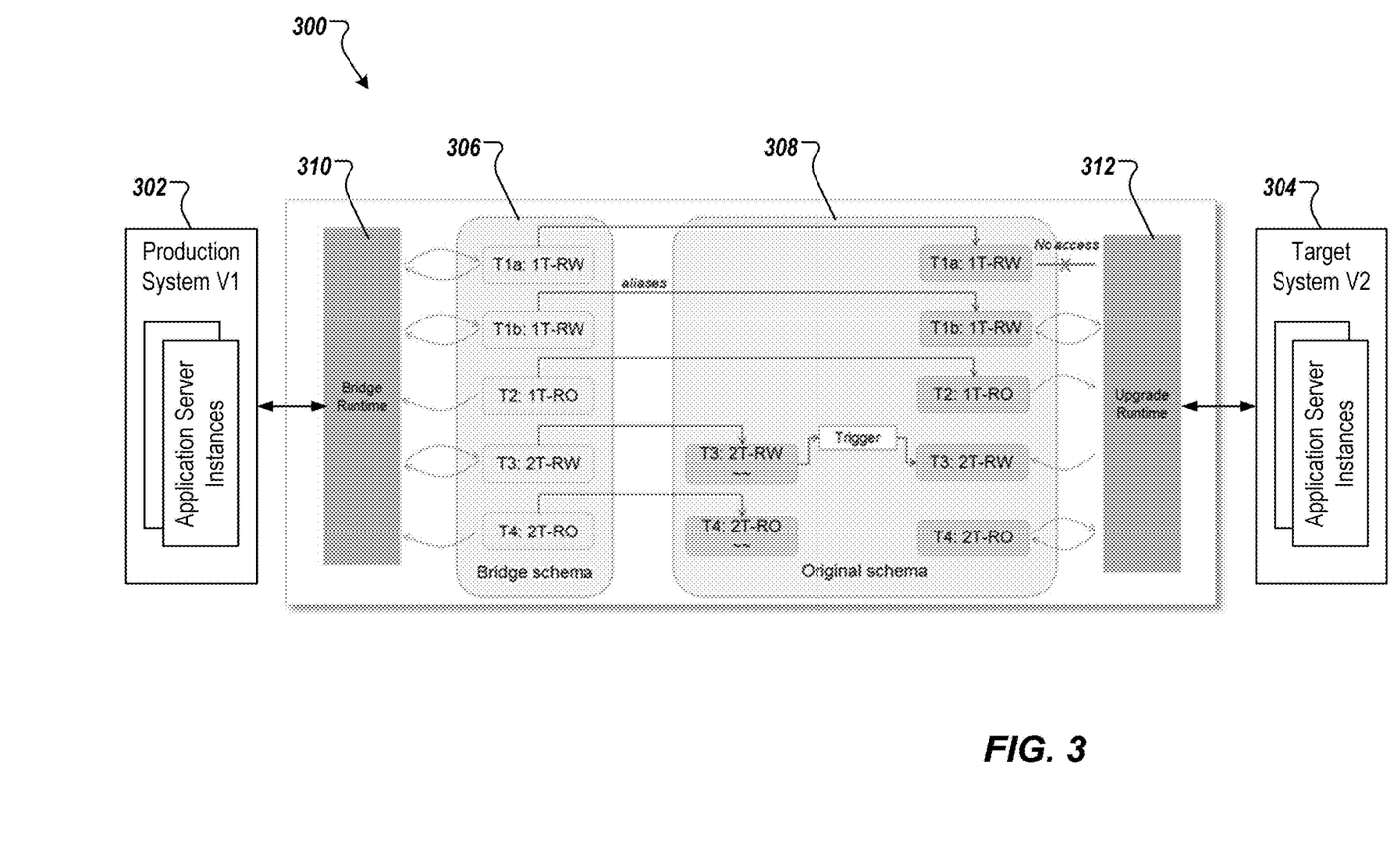
FIG. 3 schematically depicts an example database layout during a zero downtime upgrade procedure in accordance with implementations of the present disclosure.

FIG. 3 schematically depicts an example database layout 300 during a zero downtime upgrade procedure in accordance with implementations of the present disclosure. In the example of FIG. 3, a production system 302 is being upgraded to a target system 304. The production system 302 runs one or more application server instances of a first version (V1) of software, and the target system 304, when upgraded, runs various application server instances of a second version (V2) of the software. As part of the zero downtime upgrade from the production system 302 to the target system 304, a bridge database schema 306 provides various tables of data that are used by an original database schema 308 to generate and/or populate alias tables that are used to generate the tables ultimately used by the target system 304. In some implementations, the production system 302 interacts with the bridge database schema 306 through a bridge runtime 310, and the target system 304 interacts with the original database schema 308 through an upgrade runtime 310. In some examples, the target system 304 goes live to replace the production system 302 (e.g., the target system 304 transitions to be a production system replacing the production system 302). In some examples, the target system 304 can be tested prior to going live.

Implementations of the present disclosure will be described in further detail herein with reference to the example database layout 300 of FIG. 3, and an example upgrade procedure. In some implementations, the example upgrade procedure includes one or more rules. For example, a first rule provides that, if a table structure is changed (beyond simply adding a new field), a target table is created and the content is replicated from the original table to the target table. The example of FIG. 3 designates this as T3, and a DB trigger is used to keep the content in sync as between the original table and the cloned table.

As another example, a second rule provides that, if a table receives content, two cases can occur. In a first example, designated as T4 in the example of FIG. 3, the production system can function with the table being RO. In this case, the table is set to RO, and no trigger is installed. In a second example, also designated as T3 in the example of FIG. 3, the production system requires read-write (RW) access to the table. In this case, the table is cloned, and a DB trigger is installed to keep both tables in sync as between the original table and the cloned table. The DB trigger is made aware of the newly imported keys in the target and does not overwrite the keys ("collision pattern mechanism").

In some examples, the categories T1a and T1b indicate tables that are both written by the production system, but are not cloned during the upgrade procedure. In some examples, tables in category T1a are not written to by the target system during the upgrade procedure, and are only written to by the production system (e.g., an application table not changed during the upgrade), while tables in category T1b are written to by both the production and the target systems (e.g., an infrastructure table such as "logging," "user management," "batch management," which are written to by the target system as the target system also writes logs, stores, which technical user has logged in, and which batch had been started by the upgrade). Tables in category T1b are not cloned, even as the upgrade writes, as the infrastructure ensures, the data rows written by production and target systems do not overwrite each other.

In another example, a third rule provides that, for a to-be-deployed application function that reads table content, the content read by the application function needs to be put to RO (otherwise, the result of the application function could be invalidated). Two example cases can be provided. In a first example case, the table is being written to. Consequently, and designated as T4 in the example of FIG. 3, the table is switched to RO for production, and is cloned. In a second example case, the table is only read. Consequently, and designated as T2 in FIG. 3, the table is set to RO in production.

Implementations of the present disclosure will be described with continued reference to FIG. 3, and a plurality of example cases that are based on example object types affecting the upgrade procedure. The example object types include table structure changes, content for tables, and an application functions reading table content. The example cases include a database structure change (Case 1), content is to be deployed to a table that already receives content (Case 2a), content is to be deployed to a new table (a table not receiving content already) (Case 2b), an application function reading data is to be deployed, and reads from one or more new tables (Case 3).

With the example database layout 300 of FIG. 3 active, a new upgrade package that is to be deployed is analyzed to determine whether there is a database structure change (Case 1); whether there is content to be deployed to a table, and, if so, whether the table exists and already receives content in the packages managed by the upgrade (Case 2a) (e.g., whether the table is already in category T3 or T4), or whether this is a new table (Case 2b) (e.g., the table is potentially in category T1a, T1b, or T2); whether there is an application function reading data, and, if so, whether there is already a program in the packages managed by the upgrade, which reads the same tables (e.g., whether the read tables are already in category T2 or T4), or whether this is a new program reading new tables (Case 3) (e.g., the tables are potentially in categories T1a, T1b, or T3).

With regard to Case 1, if there is a new structure change, the table would have to be moved to category T3 or T4, whereby the cloning process is initiated to clone the original table, and provide a new table that includes the structure change. With regard to Case 2a, if there is content for a table, which already receives content, the set of table keys in the collision handling is enriched by the keys brought with the new package. With regard to Case 2b, if there is content for a new table, the table is provided as a category T3 or T4, and the cloning process is initiated. With regard to Case 3, the tables are set to RO, meaning either move from T1a, T1b to T2 (e.g., revoking the write permission for the bridge runtime 310), or move from T3 to T4 (also revoking the write permission).

In some examples, if an object is listed in white list, the standard deployment is used. An example is report and class coding. The tables storing these objects are T4 tables, because almost all changes contain report source and classes. In some examples, an intermediary state can occur, when the status depicted in FIG. 3 is not yet completely set up. For example, the table content deployment is then only scheduled in addition to the table content deployment of the initial change and the procedure then computes the changes of the superset of changes—initial change and correction. If an object is listed in black list, the complete change is rejected for deployment, because it is assumed that partly deployed changes may damage the system. If an object is listed in grey list, the procedure is executed with the alternative deployment.

Figure 4:
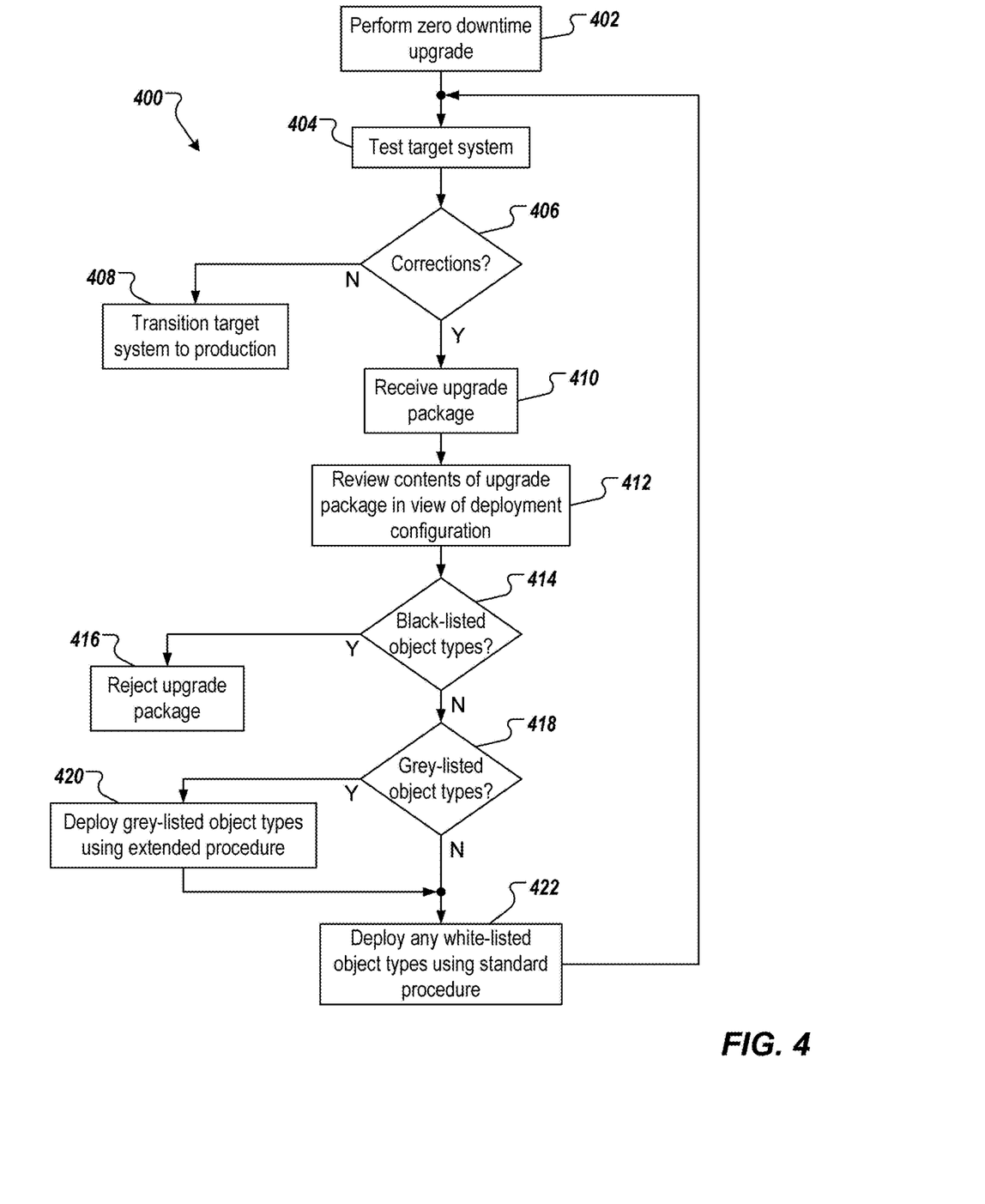
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices.

Zero downtime upgrade of a system is performed (402). For example, a zero-downtime upgrade of a production system is initiated, and at least partially conducted, as described herein (e.g., described above with respect to FIGS. 2 and 3. A target system is tested (404), and it is determined whether any corrections are needed (406). For example, and as described herein, the zero downtime upgrade results in a target system being provided (e.g., an upgraded version of the production system), and the target system can be tested to determine whether any corrections may be needed. If no corrections are needed, and the zero downtime upgrade procedure is complete, the target system is transitioned to production (408).

If corrections are needed, an upgrade package is received (410). In some examples, the upgrade package defines one or more changes to be deployed to the target system (e.g., which has already undergone partial deployment during a zero downtime upgrade), and includes one or more objects having respective object types. The upgrade package is reviewed in view of a deployment configuration (412). In some examples, the deployment configuration is provided as a machine-readable, electronic document that provides a plurality of lists of object types for respective constraints and, for each list of object types, specifies a deployment option for object types in the respective list of object types.

For a given constraint that the zero downtime upgrade has resulted in, it is determined whether any black-listed object types are included in the upgrade package (414). If a black-listed object type is included in the upgrade package, the upgrade package is rejected (416). In some examples, a new zero downtime upgrade is performed in order to deploy the upgrade package. If no black-listed object types are included in the upgrade package, it is determined whether any grey-listed object types are included in the upgrade package (418). If there is one or more grey-listed object types in the upgrade package, the grey-listed object types are deployed using an extended deployment procedure (420). In some examples, the extended deployment procedure is defined in the deployment configuration. Any white-listed object types included in the upgrade package are deployed using the standard deployment procedure (422), and the example process 400 loops back.

As discussed herein, implementations of the present disclosure enable deployment of upgrade packages during a zero downtime upgrade of a production software system. Prior to implementations of the present disclosure, it was not possible to deploy additional packages with a new deployment during a zero downtime upgrade runs. This leads to downtime, because the required upgrade packages for the target system had to be deployed once zero downtime was complete. In other words, the target system was not in the desired target state and potentially is not usable (fully), until zero downtime deployment is complete. Prior to implementations of the present disclosure, the new deployment is either done by another zero downtime deployment, or is causing downtime itself. On the other hand, implementations of the present disclosure enables deployment of additional packages during a running zero downtime procedure. Implementations improve the abilities of the procedure in order to correct the target state even with corrections created as the initial zero downtime procedure already runs. This reduces potential downtime of the production and/or target systems, and conserves computation resources (e.g., memory, processors, bandwidth).

Figure 5:
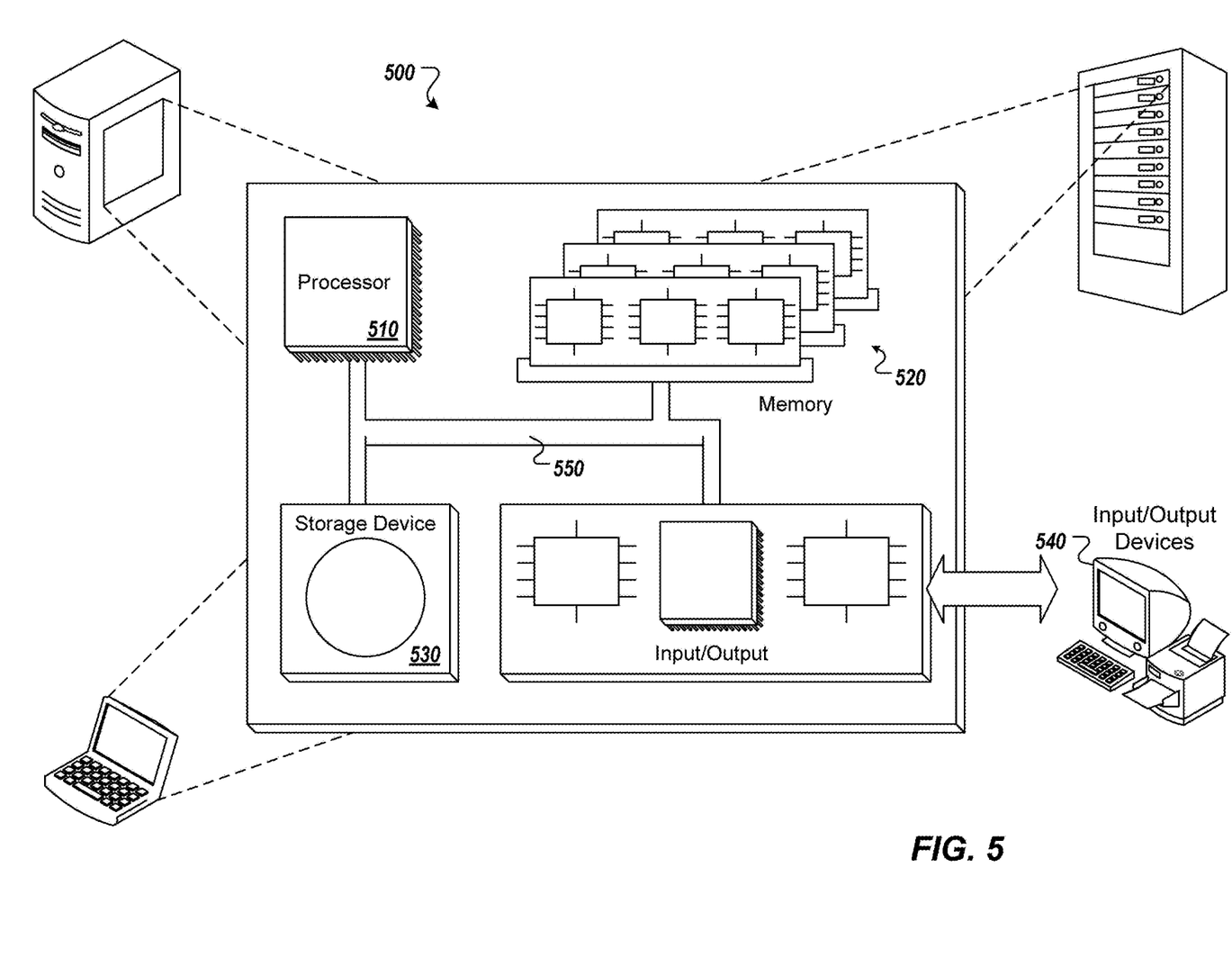
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device), for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include (e.g., a LAN, a WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for deploying upgrade packages during a zero downtime upgrade of a database system in production use, the method being executed using one or more processors and comprising:
   executing the zero downtime upgrade, during which the database system is in production use and one or more tables of a database are accessed through a bridge schema;
   receiving, by the one or more processors, an upgrade package, the upgrade package defining one or more changes to be deployed to a target version of the database system that has already undergone partial deployment during a zero downtime upgrade, and comprising one or more objects having respective object types, the partial deployment altering a state of the target database system and at least partially constraining subsequent changes to the target version of the database system;
   receiving, by the one or more processors, a deployment configuration, the deployment configuration providing a plurality of lists of object types for respective constraints, each object type indicating a component of the target version of the database system to be affected by the deployment configuration, and, for each list of object types, specifying a deployment option for the object types in the respective list of object types, deployment options comprising a standard deployment procedure, and an extended deployment procedure;
   determining, by the one or more processors, a set of object types included in the upgrade package, the set of object types comprising one or more object types; and
   selectively permitting, by the one or more processors, deployment of the upgrade package using the extended deployment procedure to execute at least one change corresponding to a grey-listed object type before switching the target version of the database system to production.

2. The method of claim 1, wherein selectively permitting deployment of the upgrade package comprises:
   determining that the upgrade package includes the grey-listed object type; and
   deploying the grey-listed object type using the extended deployment procedure.

3. The method of claim 2, wherein the extended deployment procedure comprises cloning a table of the database system to include a target structure.

4. The method of claim 1, wherein selectively permitting deployment of the upgrade package comprises:
   determining that the upgrade package includes one or more white-listed object types; and
   deploying the one or more white-listed object types using the standard deployment procedure.

5. The method of claim 1, wherein selectively permitting deployment of the upgrade package comprises:
   determining that the upgrade package includes at least one black-listed object type, and in response, rejecting the upgrade package for deployment.

6. The method of claim 1, wherein the upgrade package is received in response to a test indicating one or more corrections are to be deployed to the system.

7. The method of claim 1, wherein the zero downtime upgrade procedure is conducted to upgrade a production system, while the production system remains in production use.

8. A non-transitory computer-readable storage medium coupled to one or more processors and having instructions stored thereon which, when executed by the one or more processors, cause the one or more processors to perform operations for deploying upgrade packages during a zero downtime upgrade of a database system in production use, the operations comprising:
   executing the zero downtime upgrade, during which the database system is in production use and one or more tables of a database are accessed through a bridge schema;
   receiving an upgrade package, the upgrade package defining one or more changes to be deployed to a target version of the database system that has already undergone partial deployment during a zero downtime upgrade, and comprising one or more objects having respective object types, the partial deployment altering a state of the target database system and at least partially constraining subsequent changes to the target version of the database system;

receiving a deployment configuration, the deployment configuration providing a plurality of lists of object types for respective constraints, each object type indicating a component of the target version of the database system to be affected by the deployment configuration, and, for each list of object types, specifying a deployment option for the object types in the respective list of object types, deployment options comprising a standard deployment procedure, and an extended deployment procedure;

determining a set of object types included in the upgrade package, the set of object types comprising one or more object types; and selectively permitting deployment of the upgrade package using the extended deployment procedure to execute at least one change corresponding to a grey-listed object type before switching the target version of the database system to production.

9. The computer-readable storage medium of claim 8, wherein selectively permitting deployment of the upgrade package comprises:

determining that the upgrade package includes the grey-listed object type; and deploying the grey-listed object type using the extended deployment procedure.

10. The computer-readable storage medium of claim 9, wherein the extended deployment procedure comprises cloning a table of the database system to include a target structure.

11. The computer-readable storage medium of claim 8, wherein selectively permitting deployment of the upgrade package comprises:

determining that the upgrade package includes one or more white-listed object types; and deploying the one or more white-listed object types using the standard deployment procedure.

12. The computer-readable storage medium of claim 8, wherein selectively permitting deployment of the upgrade package comprises:

determining that the upgrade package includes at least one black-listed object type, and in response, rejecting the upgrade package for deployment.

13. The computer-readable storage medium of claim 8, wherein the upgrade package is received in response to a test indicating one or more corrections are to be deployed to the system.

14. The computer-readable storage medium of claim 8, wherein the zero downtime upgrade procedure is conducted to upgrade a production system, while the production system remains in production use.

15. A system, comprising:
a computing device; and
a computer-readable storage device coupled to the computing device and having instructions stored thereon which, when executed by the computing device, cause the computing device to perform operations for deploying upgrade packages during a zero downtime upgrade of a database system in production use, the operations comprising:

executing the zero downtime upgrade, during which the database system is in production use and one or more tables of a database are accessed through a bridge schema;

receiving an upgrade package, the upgrade package defining one or more changes to be deployed to a target version of the database system that has already undergone partial deployment during a zero downtime upgrade, and comprising one or more objects having respective object types, the partial deployment altering a state of the target database system and at least partially constraining subsequent changes to the target version of the database system;

receiving a deployment configuration, the deployment configuration providing a plurality of lists of object types for respective constraints, each object type indicating a component of the target version of the database system to be affected by the deployment configuration, and, for each list of object types, specifying a deployment option for the object types in the respective list of object types, deployment options comprising a standard deployment procedure, and an extended deployment procedure;

determining a set of object types included in the upgrade package, the set of object types comprising one or more object types; and selectively permitting deployment of the upgrade package using the extended deployment procedure to execute at least one change corresponding to a grey-listed object type before switching the target version of the database system to production.

16. The system of claim 15, wherein selectively permitting deployment of the upgrade package comprises:

determining that the upgrade package includes the grey-listed object type; and deploying the grey-listed object type using the extended deployment procedure.

17. The system of claim 16, wherein the extended deployment procedure comprises cloning a table of the database system to include a target structure.

18. The system of claim 15, wherein selectively permitting deployment of the upgrade package comprises:

determining that the upgrade package includes one or more white-listed object types; and deploying the one or more white-listed object types using the standard deployment procedure.

19. The system of claim 15, wherein selectively permitting deployment of the upgrade package comprises:

determining that the upgrade package includes at least one black-listed object type, and in response, rejecting the upgrade package for deployment.

20. The system of claim 15, wherein the upgrade package is received in response to a test indicating one or more corrections are to be deployed to the system.

* * * * *